May 14, 1929.  W. MORRISON  1,712,897

STORAGE BATTERY

Filed Sept. 10, 1924  3 Sheets-Sheet 1

Inventor:
William Morrison,
By Byrne Townsend & Brickenstein,
Attorneys.

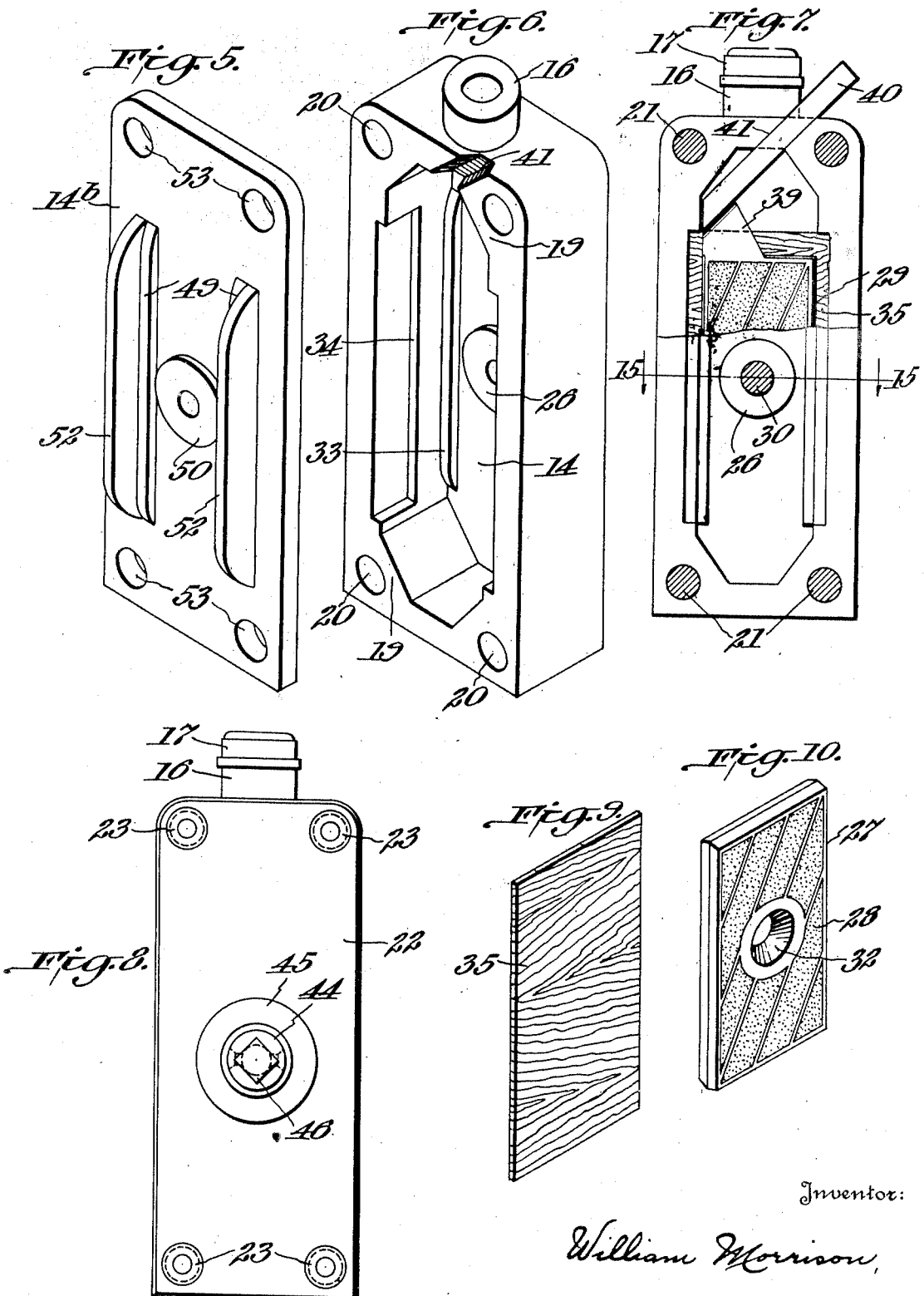

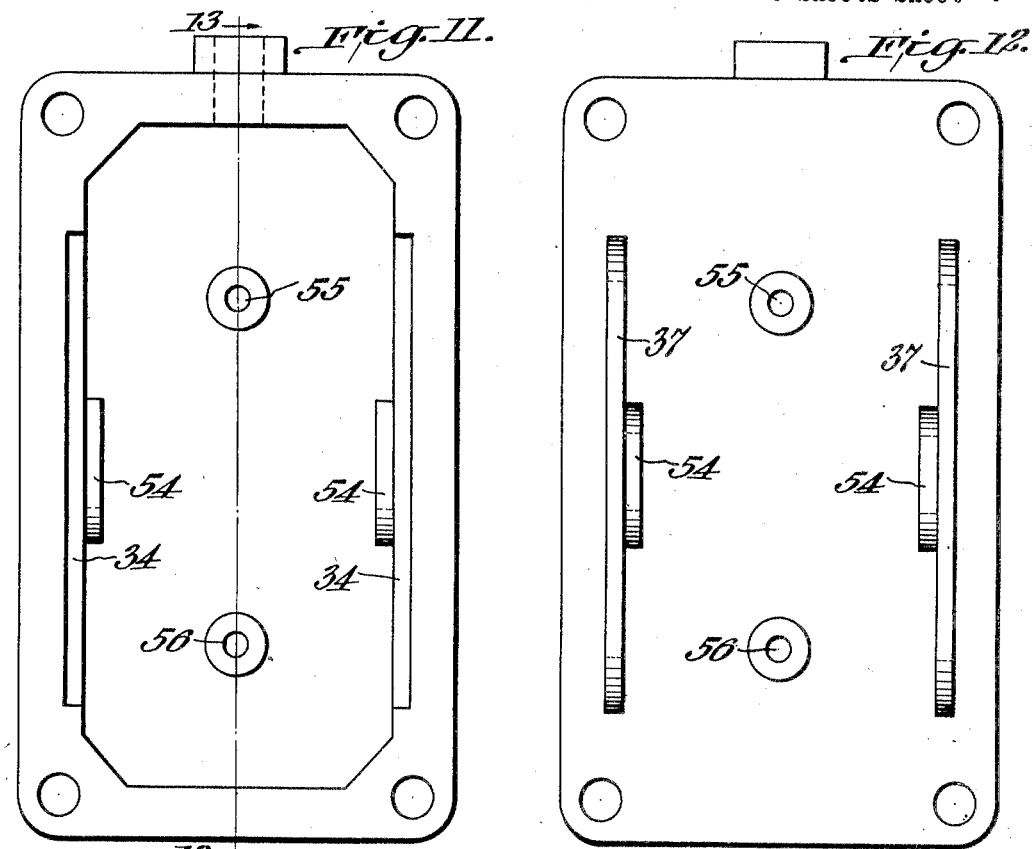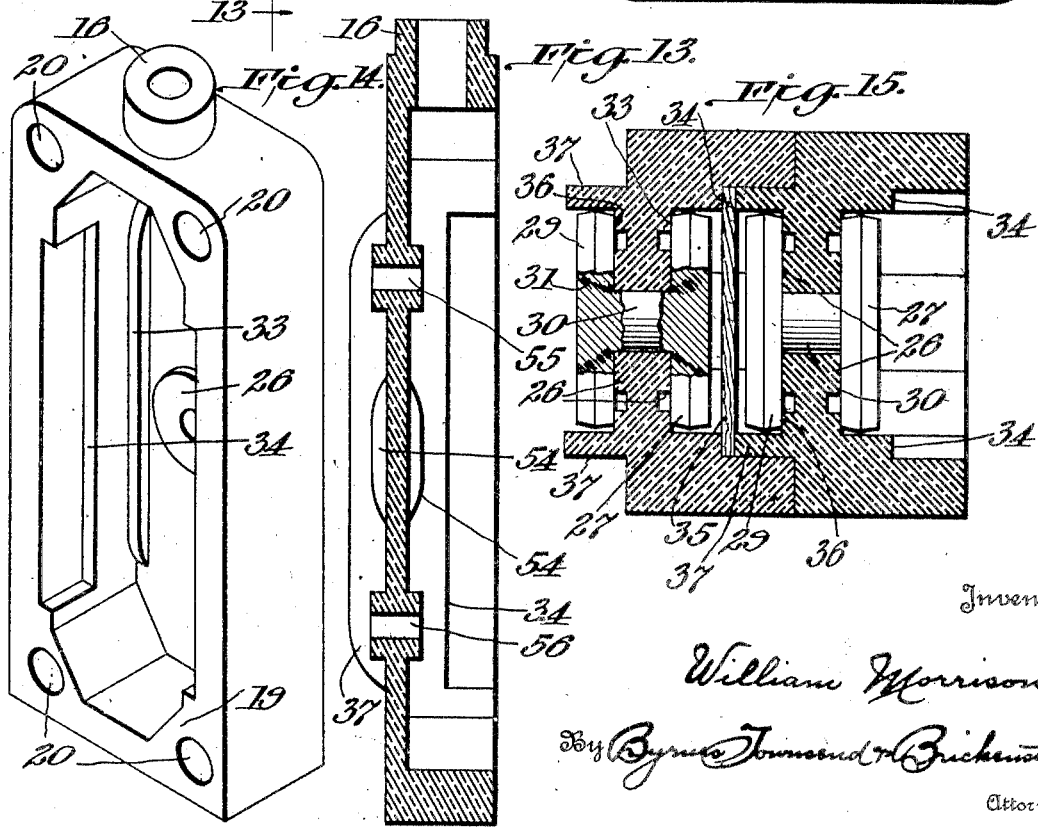

Patented May 14, 1929.

1,712,897

UNITED STATES PATENT OFFICE.

WILLIAM MORRISON, OF CHICAGO, ILLINOIS, ASSIGNOR TO VESTA BATTERY CORPORATION, OF CHICAGO, ILLINOIS, A CORPORATION OF ILLINOIS.

STORAGE BATTERY.

Application filed September 10, 1924. Serial No. 736,960.

The invention relates to secondary or storage batteries and more particularly to batteries especially suitable for radio use and the like where the rate of discharge is comparatively low.

Storage batteries as heretofore constructed have various metal parts exposed either externally, in the form of terminals and straps or other electrically conductive connections, or internally in the form of plate-lugs, connectors and unsubmerged plate portions. When employed with radio receiving sets these exposed conductors are of material disadvantage because of the likelihood of formation or collection of extraneous circuits or currents which are particularly disturbing in the operation of the more powerful and sensitive sets.

A special object of the present invention is the provision of a battery which, aside from two binding posts and possibly one or more taps in the case of so-called "B" batteries of considerable voltage, has no conductive parts on its exterior and no conductive internal parts which are not wholly submerged in the electrolyte or completely embedded in insulating material.

Other objects and advantages will be apparent upon a fuller understanding of the invention.

The battery in its preferred form is composed of a plurality of sections of acid-proof insulating material, held in face to face engagement by suitable tie-rods passing through all of the sections, under such pressure as to make the joints liquid-tight and proof against separation under any possible conditions of use of the battery. Except one end section, each section is provided with a cavity in its face. These sections may therefore be considered as consisting in general of a rim of substantial thickness and a transversely extending web. In each cavity there is a plate carrying active material and on the opposite side of the web there is another plate. These plates are connected electrically through the web by the common means which supports them in the web. In this manner two adjacent sections when assembled form a cell, one of the plates of which is at the bottom of the cavity of one of the sections while the other plate is adjacent to, but preferably not touching, the outer face of the web of the other section. The webs thus form the end walls of the shallow cells. A pervious mat is interposed in each cell between the plates but is spaced therefrom. Each of these sections is provided with a filling opening which communicates with the respective cell and a novel venting closure is fitted into such opening. The electrolyte when introduced completely covers the plates, the mats and all metal parts within the cells. The end sections vary slightly from those described and will be more fully referred to hereinafter. The main battery terminals are located at the extreme ends of the battery, below the level of the electrolyte, and connect directly with the supporting means of the plates in the respective end sections.

Further details of the construction will be more fully pointed out in connection with the accompanying drawings, wherein:

Fig. 5 is a perspective view of one of the end sections;

Fig. 6 is a perspective view of a special form of cell section showing the general interior construction;

Fig. 7 is a part elevational and part sectional view of the cell section as shown in Fig. 6 and showing the plate and pervious mat assembly;

Fig. 8 is an end view of the battery;

Fig. 9 is a perspective view of one of the pervious mats;

Fig. 10 is a perspective view of one of the plates filled with active material;

Fig. 11 is an elevation of a slightly modified form of cell section;

Fig. 12 is a similar view of the opposite face of the section;

Fig. 13 is a section through one of the modified cell sections, taken longitudinally of the battery;

Fig. 14 is a perspective view of one of the cell sections showing the interior construction; and Fig. 15 is a central horizontal section on plane 15—15 of Fig. 7.

Figure 1:
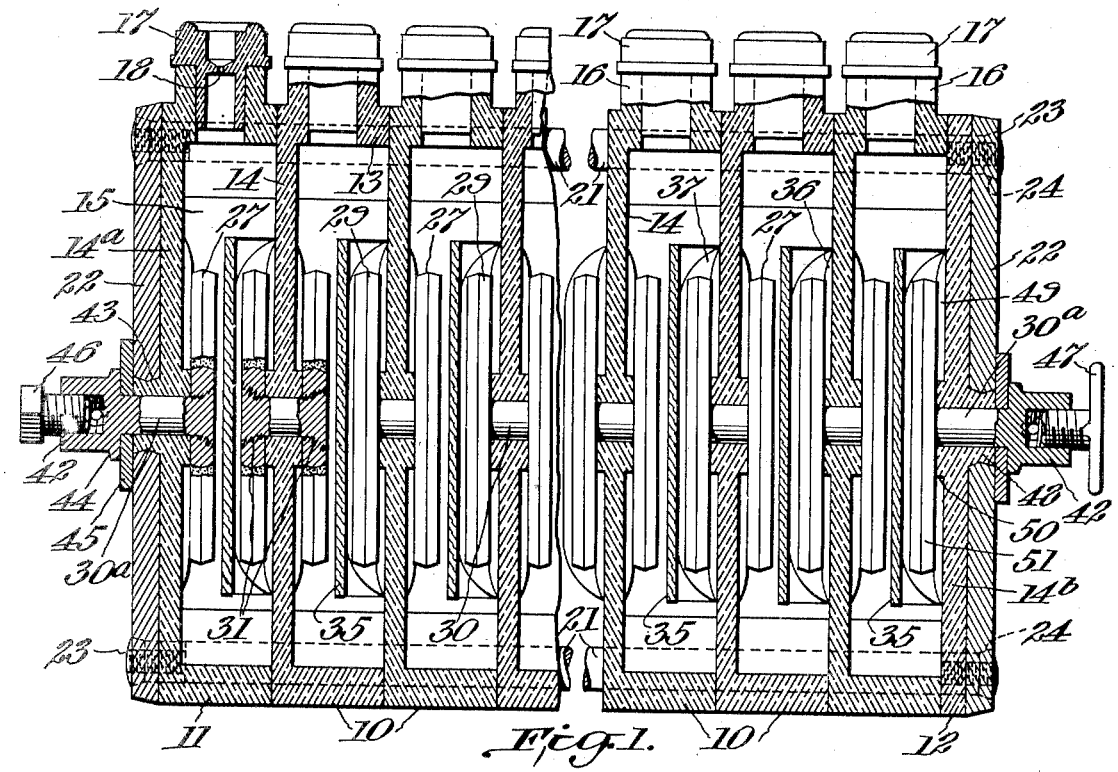
Fig. 1 is a longitudinal sectional view of a storage battery made and assembled in accordance with the present invention.

Referring particularly to Fig. 1, it will be seen that the battery is composed of a plurality of assembled sections 10, 11 and 12, the differences between which will appear presently. The cell sections are preferably composed of compressible acid-proof insulating material of the nature of comparatively stiff unvulcanized rubber; and consist in general of a rim portion 13 and an inner web portion 14. The rim portion and the web portion thus define a cavity 15 which when further enclosed by the web of an adjacent section, upon assembly of the sections, provides a well for electrolyte. Equipped with plates of active material and a pervious mat between them, this chamber constitutes a complete cell. Each cell has a filling neck 16 closed with a stopper 17. The neck and stopper construction is the subject of a companion application wherein it is more particularly described. The neck is of the compressible material of which the rim portion 13 is composed, while the stopper is preferably of compressible material but may be of stiff material like hard rubber. The vent 18 is approximately opposite the top edge of the neck 16 and cavities are provided in the stopper above and below the vent.

Figure 2:
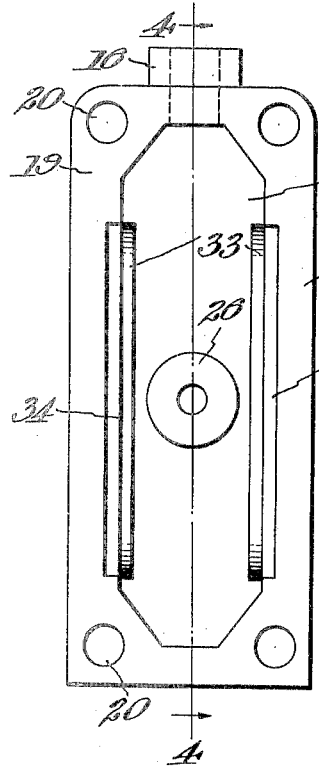
Fig. 2 is an elevation of one of the cell sections.
Figure 3:
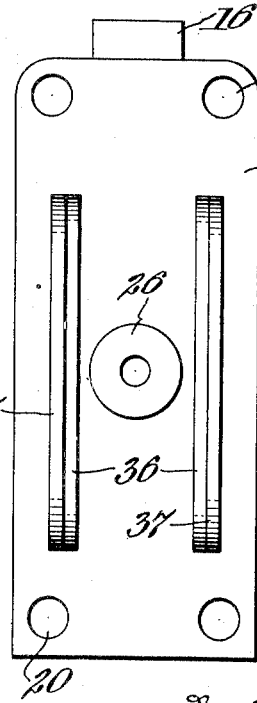
Fig. 3 is an elevation of a cell section viewed from the opposite side.
Figure 4:
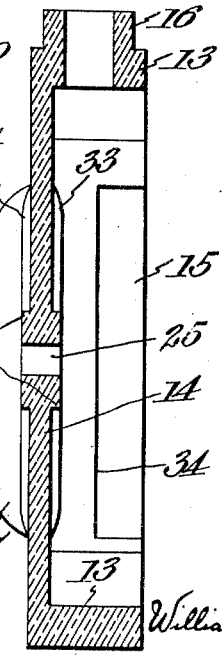
Fig. 4 is a section through one of the cell sections taken longitudinally of the battery.

As indicated in Figs. 2 and 14, the cavities 15 forming the cells are approximately rectangular. This affords maximum surface contact of electrolyte and plate in a compact construction. At the top and bottom the inner walls of the rim portions 13 may converge more or less to produce thicker corner portions 19.

Through the thickened corners 19 are apertures 20 longitudinally of the battery and the four series of apertures are adapted to register, on assembly of the cell sections, to receive tie-rods 21 which fit tightly in the apertures. At the ends of the series of cells, rigid end plates 22 are also carried on the tie-rods 21 and means are provided at the ends of the rods to maintain the cell sections and end plates in assembled condition on the rods. Such means may take the form of nuts 23 threaded on the ends of the rods and preferably the nuts are of insulating material such as a phenolic resin and lie flush with the outer faces of the end plates, which may be of metal. Preferably also the apertures in the end plates are beveled as at 24 to provide a bearing surface to take the strain.

I shall now describe one of the cell sections in more detail. Each web portion 14 has an aperture 25 and on each face of the web a boss 26 is formed about the aperture 25. On one side of the web 14, within the cavity and against a boss, is secured a grid 27 filled with active material 28; while a similar plate 29 is secured against the boss on the opposite side of the web. The plates 27, 29 are electrically connected and supported on the web by means of a lead or similar stud 30 traversing the web; the stud being materially larger in diameter than the aperture 25 so that when the stud is forced through, one cell is sealed under pressure of the compressible material from the adjacent cell. The plates are preferably burned on the stud as indicated at 31 in Fig. 1, and for this purpose each grid has a beveled central hub 32 as shown in Fig. 10.

The plates 27, 29 are preferably rectangular to obtain maximum surface of contact between the active material and the electrolyte, and since the plates are spaced from the web 14 by the bosses 26 it will be seen that the rear surface of the plates as well as the front surface is exposed to the electrolyte. In this way the last bit of active material in the plate is available for operation of the battery, and easy exit of gas is provided. The lateral edges of the plate within the cavity preferably rest on coextensive parallel ridges 33 on the inside of the web and which form additional supports for the plates in their spaced relation to the web.

The side walls of the cavities 15 are cut away or so molded as to provide ledges 34 forming the seat for a pervious mat 35. The space between the ridges 33 and the ledges 34 is sufficient to insure that even upon compression of the sections in assembling there will always be a space between the plates and the mats. The latter are preferably of wood and to prevent buckling upon compression at the edges the mats are so prepared that the grain is cross-wise, as indicated in Fig. 9. Also the mats extend well above and below the plates, as indicated, in order to prevent any possible "treeing." The mats are preferably free from grooves.

Parallel ridges 36, similar to the ridges 33, are formed on the opposite side of the web and provide additional supporting and spacing means for the plate on that side of the web. Adjacent the outer sides of the ridges 36 are larger ridges or ribs 37, the outer straight surfaces 38 of which bear against the edges of the adjacent mat 35 and hold it seated against the ledges 34, in spaced relation to the plates 29. The ribs 37 on the outer face of one section are preferably so arranged that they fit into the corresponding recesses 34, as shown in the cross-sectional view Fig. 15, thereby assisting in the assembly of the cells and also preventing lateral displacement. Ridges 33 and 36 and ribs 37 may conveniently be molded as integral parts of the cell sections.

In Figs. 6 and 7 I have illustrated a cell section which is useful at intervals in a battery on which taps for values other than the full voltage of the battery are required; for example in a "B" battery for radio work. Cast integral with the grid 29 is a flange 39 having an integral strip 40 extending at an angle out through a slot 41 in the top of the rim 13. The strip 40 is offset with respect to the flange 39 to avoid the neck portion 16 and to decrease as far as possible the depth of the opening 41. The latter flares toward the inside and its maximum width is slightly less than that of the strip 40 so that the slot will be self-sealing when the cell sections are placed under compression.

Referring to the left-hand end of Fig. 1, it will be seen that the last cell section there shown has no plate of active material on the outside of the web 14$^a$. The stud 30$^a$ there shown is an extension of one of the battery terminals 42 and passes through a deep boss on the outside of the web 14$^a$. The end plate 22 has an opening 43 which receives the boss, and between the head 44 of the battery terminal 42 and the rigid end plate 22 there is interposed a phenol resin or equivalent insulating ring 45. The stud 30$^a$ is forcibly entered through the aperture in the web and is burned to the hub of the plate 27 while the parts are strongly pressed together lengthwise of the battery. The compression of the rubber boss completely seals the aperture through the web, and to assist in this the wall of the opening 43 in the end plate 22 is beveled from each face of the plate toward the center.

The head of the battery terminal may have any suitable form. As shown, it is perforated transversely to receive a conductor and is made hollow with internal screw threads to receive a threaded nut 46 which is preferably of phenolic resin or equivalent insulating composition. The nut may be of the polygonal head type 46 for application of a wrench, or of the form 47 shown at the right end of Fig. 1, adapted for hand manipulation.

Referring to the right-hand end of Fig. 1, it will be seen that the last section there shown consists principally of a web 14$^b$ somewhat like the web portion of the other cell sections described. The closing section or plate 14$^b$ as seen in Fig. 1 and Fig. 5 is flat on its outer side excepting a deep boss 48 similar to that described in connection with the other end of the battery, and since the construction and assembly are essentially the same no further description is believed necessary. The inner face of this section resembles the faces of the intermediate cell sections described, and is provided with ridges 49 and a boss 50 for receiving the end plate 51. The section is also formed or provided with ribs 52 for holding the last mat 35 against its ledge in the adjacent section. Like the other sections this one is provided with corner apertures 53 adapted to register on assembly with the respective apertures in the other sections.

The plates on the opposite sides of the webs of the cell sections are of opposite sign, when formed, although the grids are electrically connected; and it will be understood that of the two plates in one cavity, one of them is positive while the other is negative after forming. It will be seen therefore that within each cell section there is a complete cell having two plates of opposite polarity and a pervious mat between them, the plates and mat being entirely submerged in the electrolyte. The latter is supplied in such quantity preferably that its surface is about even with the lower shoulders of the thickened corner portions.

I do not limit myself to the proportions of the parts shown. The proportions indicated in Figs. 11 to 13 are more suitable for the preparation of so-called "A" batteries which require more plate surface. The cell section indicated in these figures is essentially the same as those previously described; however, the ridges 54 on which the plates of active material rest are shown much shorter than the plates themselves, and the plates may be connected through the web and supported therein by two studs or equivalent members, although one may be sufficient. The web is therefore provided with two apertures 55, 56 with bosses on each side of the web.

In assembling the battery the sections and end plates are lined up with the ribs 37 and 52 in engagement with the corresponding recesses in the adjacent sections and their series of apertures in registry and the rods are passed through the apertures. Pressure is then applied endwise of the battery through the end plates until the sections have been compressed to the predetermined degree required to insure liquid-tight joints between the sections. Thereupon the nuts 23 are turned up upon the tie-rods by hand or machine, and the pressure may then be released.

After the cell sections have been assembled and before the electrolyte is introduced, the exposed surface of the entire battery is given a coating of waterproof and insulating varnish. This may be done by suspending the battery from its terminals and spraying the varnish on, as is well understood in the coating art. The varnish may consist of celluloid and rubber in suitable proportions, dissolved in benzol or equivalent solvent. Water or acid will not moisten such a varnish but will tend to form a series of separate beads, and not a continuous conducting film. This assists in the elimination of creeping and prevents the formation of external circuits about the battery.

It will be noted in the battery described that, excepting the main battery terminals 42 at the ends and possibly an occasional intermediate tap 40, which are sealed under pressure by virtue of the highly compressed rubber-like material, there are no exposed metal parts on the outside of the battery. Furthermore the outside of the terminals is preferably coated with a non-conducting varnish and the binding nuts are preferably of dielectric material. The metal tie-rods 21 are completely embedded in the compressed insulating material of which the cell sections are composed, the exposed ends, where a ring nut is used, are coated with the insulating varnish, and the nuts themselves are preferably of dielectric material such as phenolic resin. All metal parts within the cells as well as the main battery terminals are below the level of the electrolyte, and where not actually submerged in the electrolyte are embedded under pressure in the rubber or other compressible insulating composition of which the sections are made. With such a construction, creeping and formation of external circuits which might run the battery down are impossible. If any electrolyte gets on the outside of the battery no harm will result since the contact can be between two liquids only and there can be no outside connection between the metal elements of the cells.

I regard this as a highly important characteristic of my invention. It will be noted that each of the series of cells is completely enclosed, with the plates and separator completely immersed in electrolyte, so that no possibility exists of formation of an external short circuit from plate to plate. Further, as free space is provided on all sides of the plates, the gases generated during the operation of the cell can freely escape, thus obviating the noises otherwise liable to occur.

Various minor changes may be made in the construction without departing from the scope of my invention. While each part as described is believed to be the most practicable, yet results of varying degrees of efficiency are obtainable by changes in these parts or by substitutions. For example the webs need not be made of compressible material, or the sections themselves may be made of hard rubber with interposed sheets of soft rubber or other elastic material, but better results will be had by the use of parts constructed and arranged as described.

While the cell sections have been described for use in storage batteries, they are useful for electrolytic devices in general, including rectifiers, voltage regulators, primary batteries and even dry cells. If the cell sections are of rigid material it will be necessary to secure the sections together by vulcanization or by appropriate adhesives.

I claim:

1. A cell section for sectional storage batteries comprising a compressible rim portion, an inner web portion lying transversely of the battery, a plate supported on said web, a pervious mat across the face of the plate remote from said web, and ledges on said compressible rim portion supporting said mat out of contact with the plate even upon compression of the rim portions in assembling the sections.

2. A cell section for sectional storage batteries comprising a compressible rim portion, a flexible inner web portion lying transversely of the battery, a plate supported on said web, means integral with the web for maintaining said plate in spaced relation to said web, a pervious mat across the face of the plate remote from said web, and ledges on said compressible rim portion supporting said mat out of contact with the plate even upon compression of the rim portions in assembling the sections.

3. A cell section for sectional storage batteries comprising a compressible rim portion, an inner web portion lying transversely of the battery, a plate supported on said web, a pervious mat across the face of the plate remote from said web, compressible ledges on said rim portion and integral therewith for supporting said mat out of contact with the plate, and ribs on the adjacent side of the next cell section adapted to yieldingly contact with said mat and maintain the same on said ledges.

4. In a sectional storage battery, a pair of compressible sections combining on assembly to form a cell, plates in the cell, a wooden mat between the plates, and yielding means compressible on assembly of the battery for supporting said mat in spaced relation to the plates, said mat being supported with its grain crosswise of the cell.

5. A cell section for sectional storage batteries comprising a rim portion and an inner web portion, said portions defining a cavity in one face of the section, ridges at opposite sides of the cavity for supporting a plate for active material in spaced relation to said web portion, and ledges at opposite sides of the cavity for supporting a pervious mat in spaced relation to the plate.

6. A cell section for sectional storage batteries comprising a rim portion and an inner web portion, said portions defining a cavity in one face of the section, ridges at the opposite sides of the cavity for supporting a plate for active material in spaced relation to said web portion, and ledges at the opposite sides of the cavity of greater length than said ridges for supporting a pervious mat of greater length than the plate in spaced relation thereto.

7. A cell section comprising a rim portion and an inner web portion, said portions defining a cavity in one face of the section, said rim portion having recesses in its opposite side walls, and projecting ribs on the outer face of the section, said ribs being arranged to fit into the recesses of the adjacent section.

In testimony whereof, I affix my signature.

WILLIAM MORRISON.